(12) United States Patent
Sako et al.

(10) Patent No.: US 7,496,965 B2
(45) Date of Patent: Feb. 24, 2009

(54) DATA RECORDING MEDIUM, DATA RECORDING METHOD, DATA PROCESSING DEVICE, DATA DISTRIBUTION METHOD, DATA DISTRIBUTION DEVICE, DATA TRANSMISSION METHOD, DATA TRANSMISSION DEVICE, DATA DISTRIBUTION SYSTEM, AND DATA COMMUNICATION SYSTEM

(75) Inventors: Yoichiro Sako, Tokyo (JP); Shunsuke Furukawa, Tokyo (JP); Kaoru Kijima, Tokyo (JP); Akiko Inoue, Saitama (JP); Etsuo Shibasaki, Tokyo (JP); Yoriaki Kanada, Kanagawa (JP); Akiya Saito, Kanagawa (JP); Koichi Nakajima, Chiba (JP)

(73) Assignees: Sony Corporation, Tokyo (JP); Sony Disc & Digital Solutions Inc., Tokyo (JP)

( * ) Notice: Subject to any disclaimer, the term of this patent is extended or adjusted under 35 U.S.C. 154(b) by 978 days.

(21) Appl. No.: 10/497,159

(22) PCT Filed: Oct. 8, 2003

(86) PCT No.: PCT/JP03/12885

§ 371 (c)(1),
(2), (4) Date: Jun. 7, 2004

(87) PCT Pub. No.: WO2004/036573

PCT Pub. Date: Apr. 29, 2004

(65) Prior Publication Data

US 2005/0080877 A1 Apr. 14, 2005

(30) Foreign Application Priority Data

Oct. 15, 2002 (JP) .............................. 2002-300177

(51) Int. Cl.
*G06F 7/04* (2006.01)
*G06F 17/30* (2006.01)
*G06K 9/00* (2006.01)
*H03M 1/68* (2006.01)
*H04K 1/00* (2006.01)
*H04L 9/00* (2006.01)
*H04L 9/32* (2006.01)
*H04N 7/16* (2006.01)

(52) U.S. Cl. ........................................ 726/26; 714/722
(58) Field of Classification Search .................... 726/26
See application file for complete search history.

(56) References Cited

FOREIGN PATENT DOCUMENTS

EP 1 102 248 A1 5/2001

(Continued)

OTHER PUBLICATIONS

U.S. Appl. No. 10/497,159, filed Jun. 7, 2004, Sako et al.
U.S. Appl. No. 10/486,920, filed Feb. 24, 2004, Sako et al.

*Primary Examiner*—Kambiz Zand
*Assistant Examiner*—Dant B Shaifer Harriman
(74) *Attorney, Agent, or Firm*—Oblon, Spivak, McClelland, Maier & Neustadt, P.C.

(57) ABSTRACT

On a CD-R, a UID that is unique identification information is pre-recorded. When the CD-R is loaded into an information terminal unit, the UID is read and transmitted to a management server through the Internet. The management server determines whether predetermined data can be recorded onto the CD-R in accordance with the received UID. For example, when the UID is valid, contents data is downloaded from the management server to the information terminal unit and recorded onto the CD-R. In addition, for example, when the UID is valid, a notification that represents that contents data is permitted to be copied or moved is transmitted from the management server to the information terminal unit. As a result, contents data recorded on another recording medium can be copied or moved to the CD-R.

27 Claims, 7 Drawing Sheets

FOREIGN PATENT DOCUMENTS

| | | | |
|---|---|---|---|
| EP | 1102248 A1 | * | 5/2001 |
| JP | 5-303745 | | 11/1993 |
| JP | 05-303745 | * | 11/1993 |
| JP | 07-296508 | * | 10/1995 |
| JP | 7-296508 | | 11/1995 |
| JP | 09-198778 | * | 7/1997 |
| JP | 9-198778 | | 7/1997 |
| JP | 11-143719 | | 5/1999 |
| JP | 2001-23350 | | 1/2001 |
| JP | 2001-202694 | * | 7/2001 |
| JP | 2001-351322 | * | 12/2001 |
| JP | 2002-25199 | | 1/2002 |
| JP | 2002-298496 | * | 10/2002 |
| WO | 00/07182 | | 2/2000 |
| WO | WO 00/07182 | | 2/2000 |

* cited by examiner

DATA RECORDING MEDIUM, DATA RECORDING METHOD, DATA PROCESSING DEVICE, DATA DISTRIBUTION METHOD, DATA DISTRIBUTION DEVICE, DATA TRANSMISSION METHOD, DATA TRANSMISSION DEVICE, DATA DISTRIBUTION SYSTEM, AND DATA COMMUNICATION SYSTEM

TECHNICAL FIELD

The present invention relates to a data recording medium that is recordable and that has unique identification information and to a data recording method, a data processing apparatus, a data delivering method and a data delivering apparatus, a data transmitting method and a data transmitting apparatus, and a data delivering system and a data communication system using a data recording apparatus that is recordable and that has unique identification information.

BACKGROUND ART

In the field of data recording mediums such as a disc recording medium and a semiconductor memory onto which an end user can record data, a data recording medium to which identification information with which the data recording medium can be identified is added has been proposed. For example, Japanese Patent Laid-Open Publication No. HEI 11-250572 describes an optical disc 1 having an media ID that is unique identification information.

Conventionally, such identification information unique to each data recording medium is used to copy-protect data recorded thereon. For example, when a data recording medium is of data recordable type, unique identification information is recorded onto the data recording medium at factory before shipment. When data is reproduced from the data recording medium, the identification information is checked. In this manner, reproduction of data that is recorded on the data recording medium that is recordable can be controlled. As a result, the data can be copy-protected.

In a method using post scribed ID (registered trademark) of which after data has been recorded, identification information is post-recorded using for example high power laser light, identification information is post-recorded in for example a data area of a CD-ROM (Compact Disc-Read Only Memory). When data is reproduced from the CD-ROM using dedicated software, the data can be copy-protected. This method is often used when a game program or application software for a personal computer is recorded onto a CD-ROM.

For example, identification information unique to a data recording medium is recorded in an area that a user cannot access. When data is recorded onto the data recording medium, the unique identification information thereof is encrypted as an encryption key. As a result, the data recorded on the data recording medium can be copy-protected.

Like those examples, identification information unique to a data recording medium is used to copy-protect data. Services for users using identification information have not been considered.

For example, a system that permits a user to download data through a network in accordance with identification information unique to each data recording medium does not exist. In addition, technologies for controlling a copy and a move of data from another recording medium to the present data recording medium in accordance with identification information unique to each data recording medium do not exist.

In recent years, technologies for providing the foregoing services using identification information that is not limited to copy-protection for data have been desired.

Therefore, an object of the present invention is to provide a data recording medium, a data recording method, a data processing apparatus, a data delivering method and a data delivering apparatus, a data transmitting method and a data transmitting apparatus, and a data delivering system and a data communication system that allow services to be provided for users using identification information that is unique to and that is recorded onto each data recording medium.

DISCLOSURE OF THE INVENTION

To solve the foregoing problem, the present invention is a data recording medium on which unique identification information is recorded, wherein in accordance with the unique identification information, it is determined whether or not predetermined data can be recorded onto the data recording medium.

In addition, the present invention is a data recording method, comprising the steps of reading identification information from a data recording medium on which unique identification information is recorded; determining whether or not predetermined data can be recorded onto the data recording medium in accordance with the identification information that has been read; and recording the predetermined data onto the data recording medium in accordance with the determined result.

In addition, the present invention is a data processing apparatus, comprising recording means for recording data onto a data recording medium that is recordable and on which unique identification information is recorded; identification information reading means for reading the identification information from the data recording medium; and controlling means for determining whether or not predetermined data can be recorded onto the data recording medium in accordance with the identification information that has been read by the identification information reading means and controlling the recording means in accordance with the identification information so that the predetermined data is recorded onto the data recording medium.

In addition, the present invention is a data delivering method, comprising the steps of reading identification information from a data processing apparatus, the data processing apparatus being configured to read the unique identification information from a data recording medium that is recordable and on which the identification information is recorded and transmit the identification information to the outside of the data processing apparatus; determining whether or not the predetermined data is permitted to be delivered to the data processing apparatus in accordance with the received identification information; and delivering the predetermined data to the data processing apparatus in accordance with the determined result.

In addition, the present invention is a data delivering apparatus, comprising receiving means for receiving identification information from a data processing apparatus, the data processing apparatus being configured to read the identification information from a data recording medium that is recordable and on which unique identification information is recorded and transmit the identification information to the outside of the data processing apparatus; delivering means for delivering predetermined data to the data processing apparatus; and controlling means for determining whether or not predetermined data is permitted to be delivered to the data processing apparatus in accordance with the received identification information and delivering the predetermined data to the data processing apparatus in accordance with the determined result.

In addition, the present invention is a data transmitting method, comprising the steps of receiving identification information from a data processing apparatus, the data processing apparatus being configured to read the identification information from a first data recording medium that is recordable and on which unique identification information is recorded and transmit the identification information to the outside of the data processing apparatus; determining whether or not predetermined data recorded on a second data recording medium is permitted to be copied or moved to the first data recording medium in accordance with the received identification information; and transmitting permission data that permits the predetermined data to be copied or moved from the second data recording medium to the first data recording medium in accordance with the determined result to the data processing apparatus.

In addition, the present invention is a data transmitting apparatus, comprising receiving means for receiving identification information from a data processing apparatus, the data processing apparatus being configured to read the identification information from a first data recording medium that is recordable and on which unique identification method is recorded and transmit the identification information to the outside of the data processing apparatus; delivering means for delivering predetermined data to the data processing apparatus; and controlling means for determining whether or not predetermined data recorded on a second data recording medium is permitted to be copied or moved to the first data recording medium in accordance with the received identification information and transmitting permission data that permits the predetermined data to be copied or moved from the second data recording medium to the first data recording medium in accordance with the determined result to the data processing apparatus.

In addition, the present invention is a data delivering system, comprising a data processing apparatus having reading means for reading identification information from a data recording medium that is recordable and on which unique identification information is recorded; and a data delivering apparatus having receiving means for receiving the identification information from the data processing apparatus, delivering means for delivering predetermined data to the data processing apparatus, and controlling means for determining whether or not predetermined data is permitted to be delivered to the data processing apparatus in accordance with the received identification information and delivering the predetermined data to the data processing apparatus in accordance with the determined result.

In addition, the present invention is a data communication system, comprising a data processing apparatus having reading means for reading identification information from a first data recording medium that is recordable and on which unique identification information is recorded; receiving means for receiving the identification information from the data processing apparatus; transmitting means for transmitting predetermined data to the data processing apparatus; and a data transmitting apparatus for determining whether or not predetermined data recorded on a second data recording medium is permitted to be copied or moved to the first data recording medium in accordance with the received identification information and transmitting permission data that permits the predetermined data to be copied or moved from the second data recording medium to the first data recording medium in accordance with the determined result to the data processing apparatus.

As described above, the invention of claim 1 is a data recording medium on which unique identification information is recorded, wherein in accordance with the unique identification information, it is determined whether or not predetermined data can be recorded onto the data recording medium. Thus, data recorded onto the data recording medium can be controlled in accordance with the identification information.

The invention of claim 10 is a data recording method, comprising the steps of reading identification information from a data recording medium on which unique identification information is recorded; determining whether or not predetermined data can be recorded onto the data recording medium in accordance with the identification information that has been read; and recording the predetermined data onto the data recording medium in accordance with the determined result. Thus, data that is recorded onto the data recording medium can be controlled in accordance with the identification information.

The invention of claim 15 is a data processing apparatus, comprising recording means for recording data onto a data recording medium that is recordable and on which unique identification information is recorded; identification information reading means for reading the identification information from the data recording medium; and controlling means for determining whether or not predetermined data can be recorded onto the data recording medium in accordance with the identification information that has been read by the identification information reading means and controlling the recording means in accordance with the identification information so that the predetermined data is recorded onto the data recording medium. Thus, data that is recorded onto the data recording medium can be controlled in accordance with the identification information.

The invention of claim 20 is a data delivering method, comprising the steps of reading identification information from a data processing apparatus, the data processing apparatus being configured to read the unique identification information from a data recording medium that is recordable and on which the identification information is recorded and transmit the identification information to the outside of the data processing apparatus; determining whether or not the predetermined data is permitted to be delivered to the data processing apparatus in accordance with the received identification information; and delivering the predetermined data to the data processing apparatus in accordance with the determined result. Thus, delivery of data can be controlled in accordance with the identification information recorded on the data recording medium that is recordable.

The invention of claim 22 is a data delivering apparatus, comprising receiving means for receiving identification information from a data processing apparatus, the data processing apparatus being configured to read the identification information from a data recording medium that is recordable and on which unique identification information is recorded and transmit the identification information to the outside of the data processing apparatus; delivering means for delivering predetermined data to the data processing apparatus; and controlling means for determining whether or not predetermined data is permitted to be delivered to the data processing apparatus in accordance with the received identification information and delivering the predetermined data to the data processing apparatus in accordance with the determined result. Thus, delivery of data can be controlled in accordance with the identification information recorded on the data recording medium that is recordable.

The invention of claim 24 is a data transmitting method, comprising the steps of receiving identification information from a data processing apparatus, the data processing apparatus being configured to read the identification information from a first data recording medium that is recordable and on which unique identification information is recorded and transmit the identification information to the outside of the data processing apparatus; determining whether or not predetermined data recorded on a second data recording medium is permitted to be copied or moved to the first data recording medium in accordance with the received identification information; and transmitting permission data that permits the predetermined data to be copied or moved from the second data recording medium to the first data recording medium in accordance with the determined result to the data processing apparatus. Thus, a copy or a move of the predetermined data recorded on the second data recording medium to the first data recording medium can be controlled in accordance with the identification information recorded on the first data recording medium.

The invention of claim 25 is a data transmitting apparatus, comprising receiving means for receiving identification information from a data processing apparatus, the data processing apparatus being configured to read the identification information from a first data recording medium that is recordable and on which unique identification method is recorded and transmit the identification information to the outside of the data processing apparatus; delivering means for delivering predetermined data to the data processing apparatus; and controlling means for determining whether or not predetermined data recorded on a second data recording medium is permitted to be copied or moved to the first data recording medium in accordance with the received identification information and transmitting permission data that permits the predetermined data to be copied or moved from the second data recording medium to the first data recording medium in accordance with the determined result to the data processing apparatus. Thus, a copy or a move of the predetermined data recorded on the second data recording medium to the first data recording medium can be controlled in accordance with the identification information recorded on the first data recording medium.

The invention of claim 26 is a data delivering system, comprising a data processing apparatus having reading means for reading identification information from a data recording medium that is recordable and on which unique identification information is recorded; and a data delivering apparatus having receiving means for receiving the identification information from the data processing apparatus, delivering means for delivering predetermined data to the data processing apparatus, and controlling means for determining whether or not predetermined data is permitted to be delivered to the data processing apparatus in accordance with the received identification information and delivering the predetermined data to the data processing apparatus in accordance with the determined result. Thus, delivery of data can be controlled in accordance with the identification information recorded on the data recording medium that is recordable.

The invention of claim 27 is a data communication system, comprising a data processing apparatus having reading means for reading identification information from a first data recording medium that is recordable and on which unique identification information is recorded; receiving means for receiving the identification information from the data processing apparatus; transmitting means for transmitting predetermined data to the data processing apparatus; and a data transmitting apparatus for determining whether or not predetermined data recorded on a second data recording medium is permitted to be copied or moved to the first data recording medium in accordance with the received identification information and transmitting permission data that permits the predetermined data to be copied or moved from the second data recording medium to the first data recording medium in accordance with the determined result to the data processing apparatus. Thus, a copy or a move of the predetermined data recorded on the second data recording medium to the first data recording medium can be controlled in accordance with the identification information recorded on the first data recording medium.

BEST MODES FOR CARRYING OUT THE INVENTION

Next, a first embodiment of the present invention will be described. According to the first embodiment of the present invention, a service is provided for an end user using identification information that identifies an individual data recording medium onto which the end user can record data.

In the following, identification information that identifies an individual data recording medium is referred to as a UID (Unique Identifier). It is preferred that a UID is unique to an individual data recording medium. Practically, it is thought that a UID may be unique in a manufacturer of data recording mediums or in a product model of data recording mediums. In addition, it is preferred that an UID is recorded in an area to which an end user cannot write data.

As a data recording medium onto which data can be recorded by a user, there would be for example a variety of types such as a hard disk drive and a semiconductor memory as well as a write-once type CD-R (Compact Disc-Recordable) and data rewritable CD-RW (Compact-ReWritable). In the following description, it is assumed that a data recording medium onto which data can be recorded by a user is a CD-R.

Figure 1:
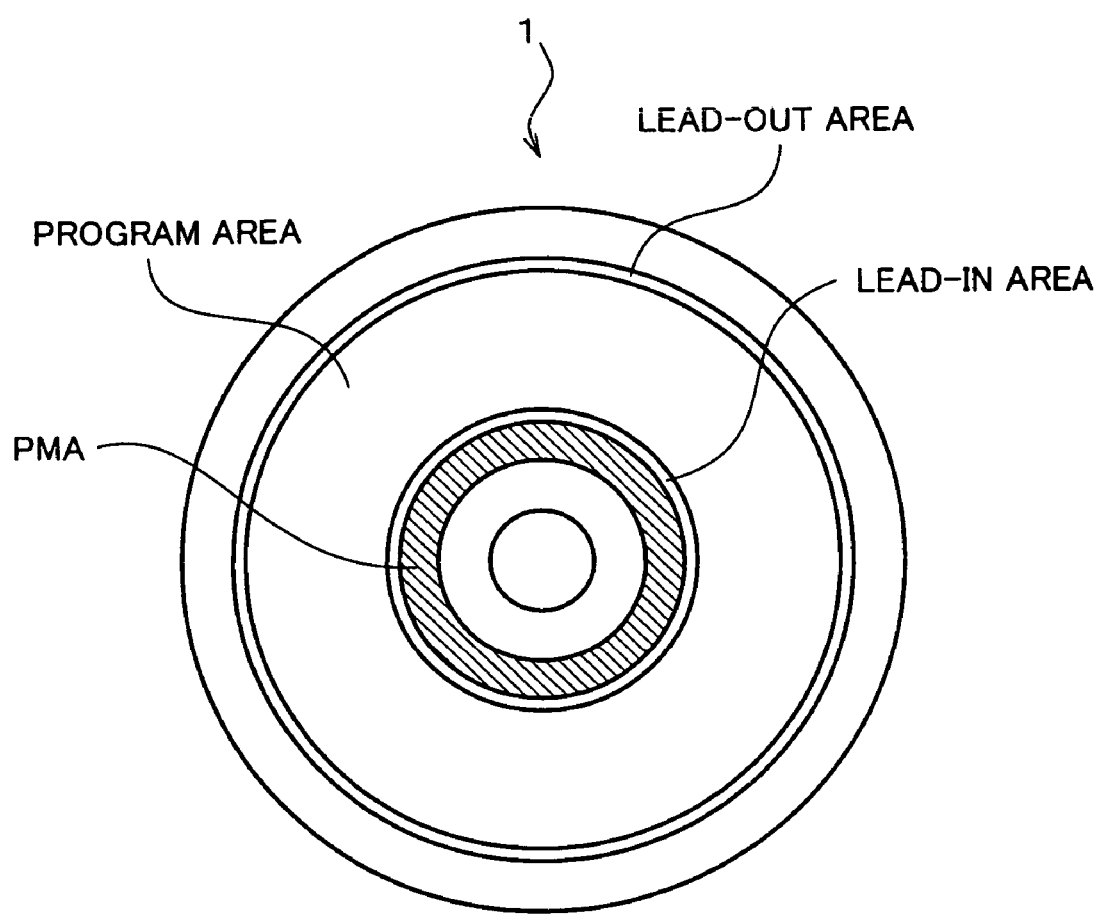
FIG. 1 is a schematic diagram showing a data layout of a CD-R.

FIG. 1 schematically shows a data layout of a CD-R. The CD-R 1 is accessed from an inner periphery side. From the inner periphery side, data areas are arranged in the order of a lead-in area, a program (data) area, and a lead-out area. A session is composed of a lead-in area, a program area, and a lead-out area. In the lead-in area, a TOC (Table of Contents) that contains information that represents recorded contents of the CD-R is recorded.

The arrangement composed of the lead-in area, program area, and lead-out area is the same as that of a CD for example a CD-DA (Compact Disc-Digital Audio) and a CD-ROM (Compact Disc-Read Only Memory) onto which data cannot be recorded by a user.

As a specific structure of a CD-R, in addition to the foregoing lead-in area, program area, and lead-out area, two areas PCA (Power Calibration Area) and PMA (Program Memory Area) are formed on an inner side of a data area of a conventional unrecordable CD (Compact Disc). Although not shown in FIG. 1, the PCA is a test write area used to adjust the strength of laser for writing data to the CD-R. On the other hand, the PMA is an area to which for example information of the beginning and end of a written track in accordance with Track At Once that will be described later is written.

In addition, on a CD-R, pre-grooves are formed as guiding grooves used to record data. The pre-grooves are slightly wobbled so as to contain address information of data that is recorded. The address information is referred to as ATIP (Absolute Time In Pregroove).

There are two typical recording methods in which data is written to a CD-R. The first method is Disc At Once of which a lead-in, data, and a lead-out are written to a disc in a single stroke writing manner. The other method is Track At Once of which data is written track by track. In the Track At Once, since a lead-out and lead-in are written after data is recorded, until a session is closed by writing the lead-out and lead-in, a track can be additionally written.

When data is written in accordance with the Track At Once, the following process is performed. When data of a first track has been written, record start and end times that are obtained in accordance with the ATIP information are written to the PMA along with a track number TNO. Likewise, when a second track has been written after the first track has been written, the record start and end times are written to the PMA along with a track number TNO. After all tracks have been written, a lead-out is written. Thereafter, TOC information is-created in accordance with information written in the PMA. Thereafter, a lead-in is written. In the Track At Once, a process for writing a lead-out, creating the TOC information in accordance with the PMA, and writing a lead-in is referred to as finalizing.

According to the present invention, the foregoing UID is recorded in for example the PMA. Since an end user cannot access the PMA, this area is suitable for an UID. A UID is recorded in the PMA of a CD-R 1 before it is shipped from the factory. When a manufacturer side wants to manage a UID, it is composed of for example a manufacturer name, a works (factory) name, codes of a production year, month, and day, a serial number, and check data such as CRC (Cyclic redundancy check) against those items of data. Alternatively, a UID may be a simple serial number.

Figure 2:
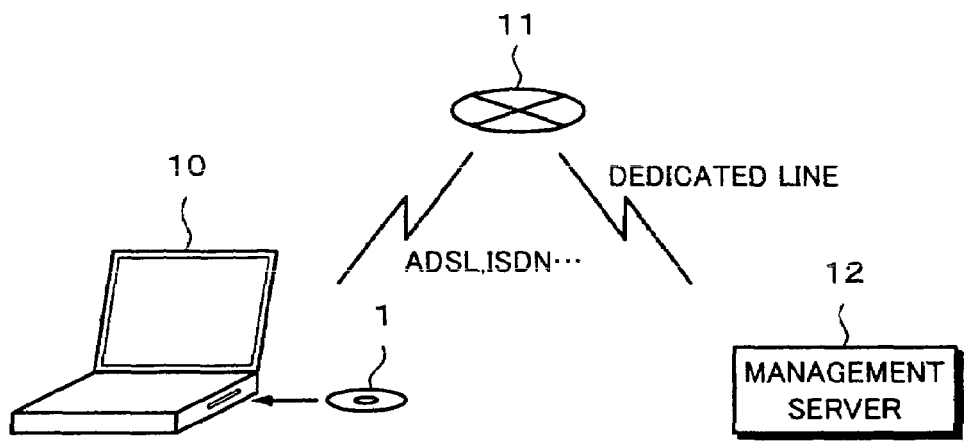
FIG. 2 is a schematic diagram showing a structure of an example of a system according to the present invention.

FIG. 2 shows a structure of an example of a system according to the present invention. An information terminal unit 10 is a computer unit such as a personal computer. The information terminal unit 10 has a drive unit that is capable of writing data to a CD-R 1. The information terminal unit 10 is connected to Internet 11 in accordance with a communication system using a public telephone line such as an ADSL (Asymmetrical Digital Subscriber Line) or an ISDN (Integrated Services Digital Network). A management server 12 has a database of for example UIDs. The system provides a service for a user using a UID. The management server 12 is connected to the Internet 11 through for example a dedicated communication line.

It should be noted that the information terminal unit 10 is not limited to the foregoing example. In other words, as long as the information terminal unit 10 can record data onto the CD-R 1, the information terminal unit 10 may be another information unit. Since the structures of the information terminal unit 10 and the management server 12 are the same as the structure of a conventional computer unit and their structures are known. Thus, the description of those structures will be omitted.

Figure 3:
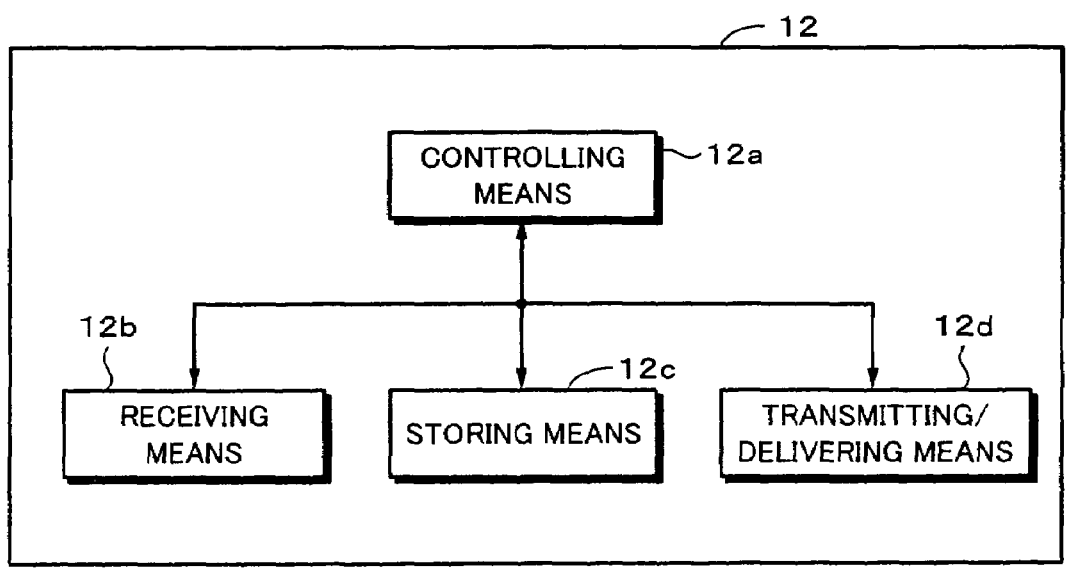
FIG. 3 is a schematic diagram showing a structure of an example of a management server.

As shown in FIG. 3, the management server 12 is structured with a controlling means 12a, a receiving means 12b, a storing means 12c, and a transmitting/delivering means 12d. The receiving means 12b receives data from the outside through for example the Internet 11. The storing means 12c is composed of a storing medium such as a hard disk or a memory. The storing means 12c stores the foregoing database of UIDs and other data. The transmitting/delivering means 12d transmits and/or delivers data to the outside through for example the Internet 11. The controlling means 12a has for example a CPU (Central Processing Unit) and controls each of those means in accordance with determined results of various determining processes that the CPU performs.

Next, an operation of the system shown in FIG. 2 according to the first embodiment of the present invention will be described in brief. The CD-R 1 is loaded into the drive unit of the information terminal unit 10. A UID that is recorded in the PMA is read from the CD-R 1. The UID that has been read is transmitted from the information terminal unit 10 to the management server 12 through the Internet 11. The management server 12 is capable of providing a service for the information terminal unit 10.

The management server 12 stores for example contents data such as music data, video data, document data, and program data. When the UID transmitted from the information terminal unit 10 is authenticated by the management server 12, it permits the information terminal unit 10 to download contents data stored in the management server 12. The contents data downloaded from the management server 12 to the information terminal unit 10 is recorded onto the CD-R 1, which has been loaded into the information terminal unit 10 and authenticated by the management server 12.

Figure 4:
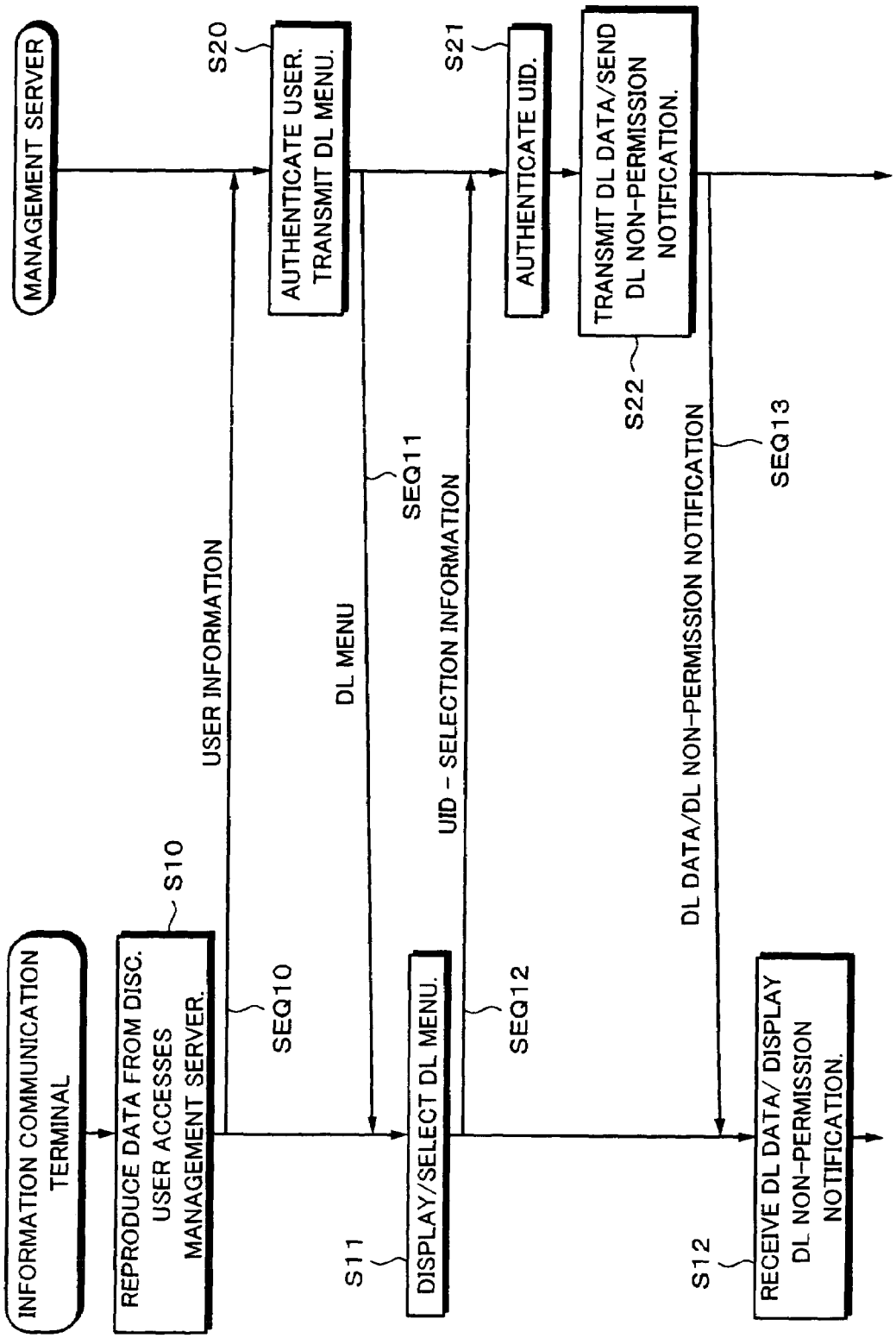
FIG. 4 is a sequence chart showing a procedure of an example of a data process preformed between an information terminal unit and a management server.

FIG. 4 shows a procedure of an example of a data process performed between the information terminal unit 10 and the management server 12 according to the first embodiment of the present invention. Before the process shown in FIG. 4 is performed, the CD-R 1 is loaded into the information terminal unit 10 and a UID is read from the CD-R 1. In addition, a menu program for providing a service according to the first embodiment is started up. Thereafter, a menu screen is displayed on a displaying means of the information terminal unit 10.

The information terminal unit 10 side reproduces data from the disc (CD-R 1). A user accesses the management server 12 through the foregoing menu program (at step S10). As a result, user information is transmitted from the information management terminal 10 to the management server 12 through the Internet 11 (at SEQ 10).

When the user information has been received by the management server 12, it authenticates the user in accordance with the received user information (at step S20). The user is authenticated for example in the following manner. A user who wants to receive a service from the management server 12 has to pre-register his or her user information thereto. The management server 12 collates the user information transmitted from the information terminal unit 10 at SEQ 10 with the user information pre-registered in the management server 12 so as to authenticate the user.

At step S20, a download (DL) menu that shows download items is transmitted from the management server 12 to the information terminal unit 10 authenticated thereby (at SEQ 11). The download menu is for example a list of contents that the authenticated user can download from the management server 12.

When the download menu is received by the information terminal unit 10, the download menu is displayed on the displaying unit of the information terminal unit 10 at step S11. When contents to be downloaded are selected in accordance with the displayed download menu by the user, the UID that has been read from the CD-R 1 loaded into the information terminal unit 10 and information that represents the selected contents are transmitted to the management server 12 (at SEQ 12). The information terminal unit 10 requests the management server 12 to download the selected contents.

When the management server 12 has received the UID transmitted at SEQ 12, the management server 12 authenticates the UID with reference to the database of UIDs that the management server 12 has (at step S21). The download data or a download non-permission notification is transmitted from the management server 12 to the information terminal unit 10 in accordance with the authenticated result at step S22 and SEQ 13.

When the authenticated result represents that the UID is valid, the contents requested by the management server 12 to the information terminal unit 10 is transmitted as download data at step S22 and SEQ 13. In contrast, when the authenticated result represents that the UID is not valid, a download non-permission notification that represents that the requested contents are not permitted to be downloaded is transmitted from the management server 12 to the information terminal unit 10 at step S22 and SEQ 13.

When the download data has been transmitted from the management server 12 at SEQ 13, the download data is received by the information terminal unit 10 at step S12. Thereafter, the received download data is recorded onto the CD-R 1 loaded into the information terminal unit 10.

In contrast, when the download non-permission notification has been transmitted from the management server 12 at SEQ 13, the download non-permission notification is received by the information terminal unit 10 at step S12. Information that represents that the requested contents are not permitted to be downloaded is displayed on the displaying means of the information terminal unit 10.

The menu program is pre-stored in a storing medium of the information terminal unit 10. When the CD-R 1 is loaded into the information terminal unit 10, the menu program is automatically started up.

Alternatively, the menu program may be started up in accordance with a user's operation of the information terminal unit 10.

Alternatively, the menu program may be pre-recorded onto the CD-R 1. In this case, the CD-R 1 is a hybrid disc whose inner periphery and outer periphery are a recorded CD-ROM portion and a writable CD-R portion, respectively. The menu program is pre-recorded in the CD-ROM portion. In this case, it is more preferred that when the CD-R 1 is loaded into the drive unit, the menu program should be automatically started up.

There could be two methods for an operation performed when the CD-R 1 is loaded into the information terminal unit 10. In the first method, after the foregoing menu program is started up, the CD-R 1 is loaded. In the second method, after the CD-R 1 is loaded and then it is determined whether or not the CD-R 1 has a UID, the menu program is started up.

Figure 5:
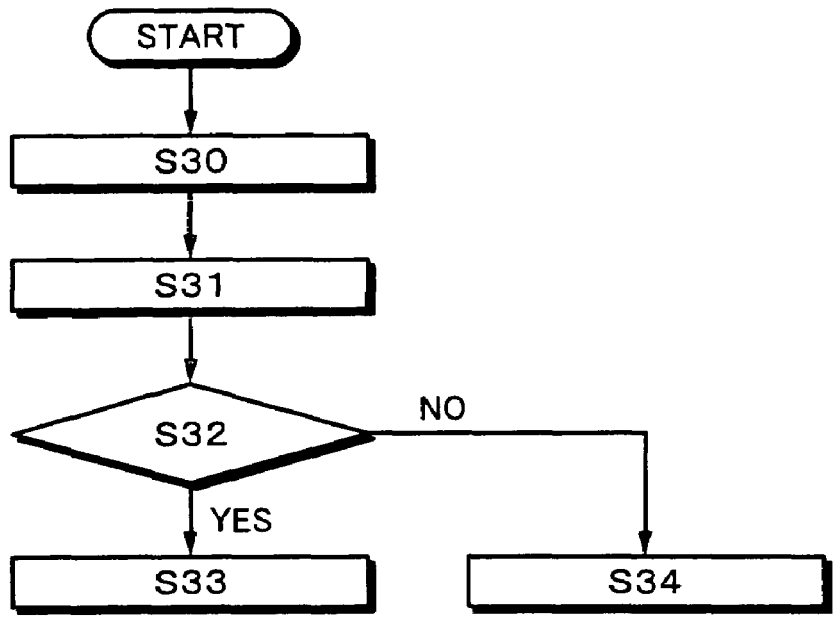
FIG. 5 is a flow chart showing an example of a process for starting up a menu program, loading a CD-R, and determining whether or not a UID is present.

FIG. 5 shows an example of a process performed in accordance with the first method. After the menu program is started up on the information terminal unit 10 at step S30, an optical disc is loaded into the-disc drive of the information terminal unit 10 at step S31. When the disc has been loaded into the disc drive, an area of for example the PMA of the disc is accessed by the menu program at step S32. The menu program determines whether or not a UID is recorded. When the menu program has determined that an UID is recorded, the process advances to step S33. The process described with reference to FIG. 4 is started up at step S33. In contrast, when the determined result at step S32 represents that a UID is not recorded onto the loaded optical disc, the process advances to step S34. The disc drive is controlled by the menu program for example so that the loaded disc is unloaded at step S34.

Figure 6:
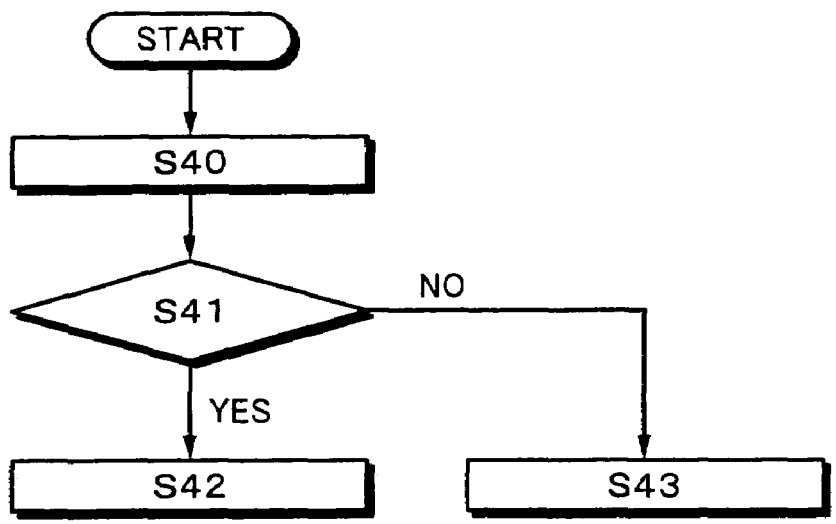
FIG. 6 is a flow chart showing an example of a process for loading a CD-R, determining whether or not an UID is present, and starting up a menu program.

FIG. 6 shows an example of a process performed in accordance with the second method. First of all, an optical disc is loaded into the disc drive of the information terminal unit 10 at step S40. When the disc has been loaded, an area of for example the PMA of the disc is accessed by for example an OS (Operating System) of the information terminal unit 10. The OS determines whether or not a UID is recorded (at step S41). When the OS has determined that a UID is recorded, the process advances to step S42. The foregoing menu program is started up by the OS at step S42. As a result, the process described with reference to FIG. 4 can be started up. When the OS has determined that a UID is not recorded, the process advances to step S43. In this case, the menu program is not started up.

When the OS has determined that a UID is recorded at step S41, the menu program can be manually operated at step S42. In this case, when a UIS is not recorded onto the optical disc, the menu program is not permitted to be started up at step S43.

When the menu program is pre-recorded onto the CD-R 1, since it is clear that a UID is recorded onto the disc, it is not always necessary to determine whether or not the UID is recorded.

Figure 7:
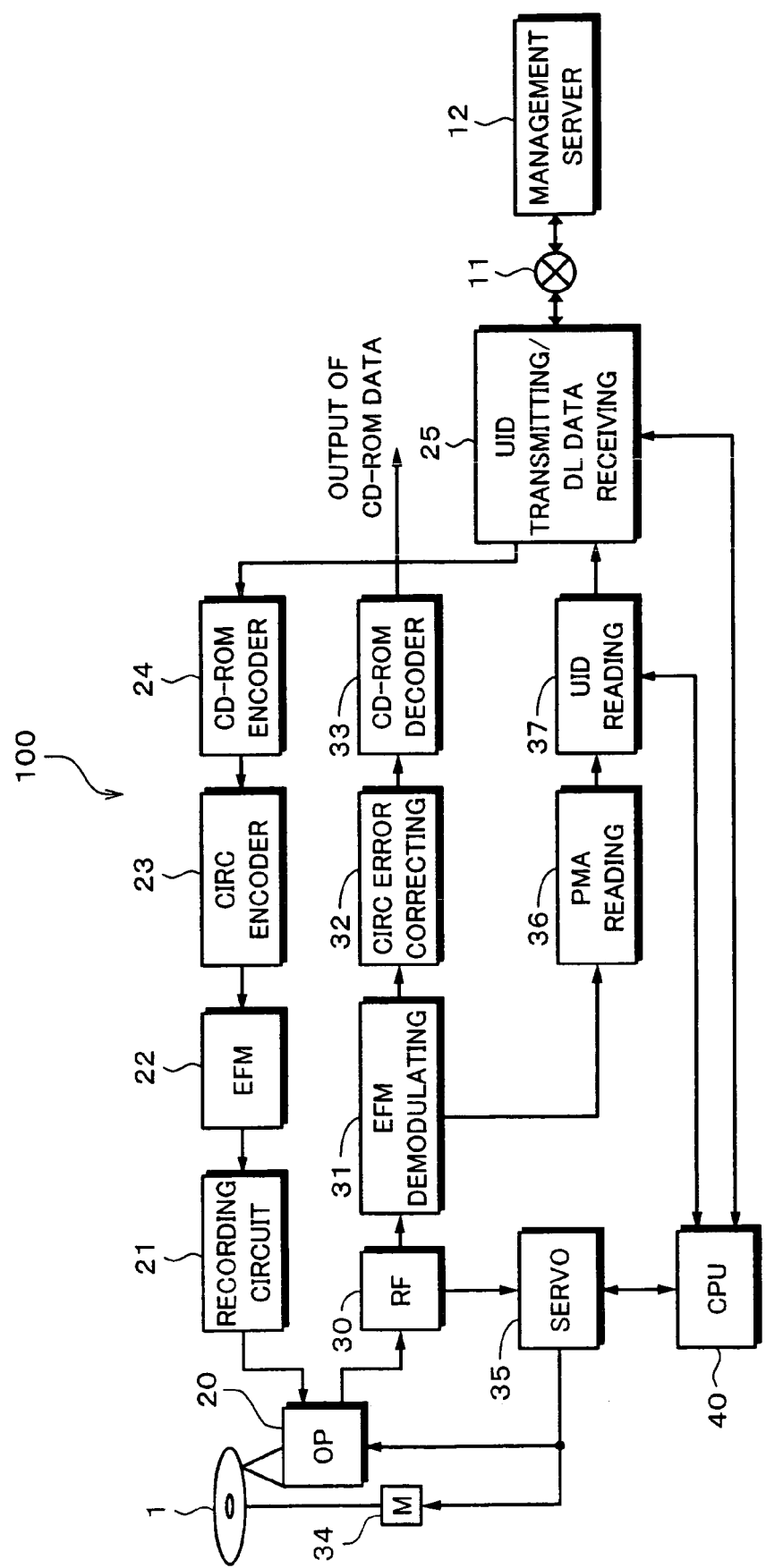
FIG. 7 is a block diagram showing a structure of an example of a data recording/reproducing apparatus according to a first embodiment of the present invention.

FIG. 7 shows a structure of an example of a data recording/reproducing apparatus according to the first embodiment of the present invention. The data recording/reproducing apparatus 100 is used in such a manner that it is built in the foregoing information terminal unit 10. All the data recording/reproducing apparatus 100 is controlled by a CPU (Central Processing Unit) 40. The CPU 40 has a RAM as a work memory and a ROM in which a program such as firmware is pre-recorded (the RAM and ROM are not shown). The CPU 40 controls the apparatus in accordance with the program recorded in the ROM. In addition, the CPU 40 has an interface with the main body of the information terminal unit 10 so as to allow the information terminal unit 10 side to control the data recording/reproducing apparatus 100.

An optical system OP 20 includes an optical pickup portion that records/reproduces data to/from the CD-R 1, a controlling circuit that controls a power and focus of the optical pickup, a thread motor drive that controls a position of the optical pickup, and a controlling circuit thereof. The optical pickup portion has an optical block, a laser driver, and a converting portion (not shown). The optical block has an objective lens, a laser light source, and a light receiving portion that receives laser light reflected by the loaded disc. The laser driver modulates a supplied signal and drives the laser light source in accordance therewith. The converting portion converts laser light received by the light receiving portion into an electric signal.

A motor M 34 is a spindle motor that rotates and drives the disc loaded into the data recording/reproducing apparatus. The optical system OP 20 and the motor 34 are controlled by a servo circuit 35 in a predetermined manner. The servo circuit 35 is controlled by the CPU 40.

In a reproducing system, the CD-R 1 is rotated and driven at CLV under the control of the servo circuit 35. In the optical system OP 20, a laser output of the laser light source is controlled so that the strength thereof becomes suitable for reproduction. The optical system OP 20 irradiates laser light to the CD-R 1. The laser light is reflected by the CD-R 1 and received by the light receiving portion. The received laser light is converted into an electric signal as a reproduction signal. The reproduction signal is output from the optical system OP 20 and supplied to an RF portion 30. For the reproduction signal, a predetermined signal process such as a waveform trimming process is performed by the RF portion 30. The processed signal is referred to as a reproduction digital signal.

In addition, the RF portion 30 performs a bi-phase modulation and an FM demodulation for the reproduction signal that is output from the optical system OP 20, extracts the ATIP from the FM demodulated signal, and supplies the ATIP to the servo circuit 35.

The reproduction digital signal that is output from the RF portion 30 is supplied to an EFM demodulating circuit 31. The EFM demodulating circuit 31 demodulates the EFM-modulated reproduction signal. The signal has been EFM-modulated when it has been recorded onto the CD-R 1. The EFM-demodulated data is reproduction digital data. The reproduction digital data is supplied to a CIRC error correcting circuit 32. In addition, the reproduction digital data is supplied to a PMA reading circuit 36. The CIRC error correcting circuit 32 decodes error correction codes in accordance with the CIRC (Cross Interleave Reed-Solomon Code) system for the supplied reproduction digital data so as to correct errors thereof. The reproduction data that is output from the CIRC error correcting circuit 32 is supplied to a CD-ROM decoder 33. The CD-ROM decoder 33 decodes the reproduction data with error correction codes for CD-ROM and further corrects errors of the reproduction data.

On the other hand, when the optical system OP 20 accesses the PMA of the CD-R 1, the PMA reading circuit 36 reads the data of the PMA from the supplied reproduction digital data. The PMA data that has been read is supplied to a UID reading circuit 37. The UID reading circuit 37 extracts a UID from the supplied PMA under the control of the CPU 40. The extracted UID is supplied to a UID transmitting/DL data receiving circuit 25 and transmitted to the management server 12 through the Internet 11 under the control of the CPU 40.

Contents selection information designated at SEQ 12 shown in FIG. 4 is transferred for example from the main body of the information terminal unit 10 to the CPU 40. Thereafter, the contents selection information is supplied from the CPU 40 to the UID transmitting/DL data receiving circuit 25. The selection information is transmitted from the UID transmitting/DL data receiving circuit 25 to the management server 12 through the Internet 11 along with the UID supplied from the UID reading circuit 37.

As was described with reference to FIG. 4, the management server 12 authenticates the received UID. When the management server 12 has determined that the UID is valid, contents data represented in the selection information received along with the UID is transmitted as download (DL) data from the management server 12 to the information terminal unit 10 through the Internet 11. In contrast, when the management server 12 had determined that the UID is not valid, the management server 12 transmits a download non-permission notification to the information terminal unit 10.

The download data or download non-permission notification is received by the UID transmitting/DL data receiving circuit 25. The received download data is supplied to a CD-ROM encoder 24. The received download non-permission notification is supplied to for example the CPU 40 and transferred to the main body of the information terminal unit 10. Information that represents that the contents are not permitted to be downloaded is displayed on the displaying means of the information terminal unit 10.

In a recording system, the CD-ROM encoder 24 encodes the download data with ECC (Error Correcting Code) and EDC (Error Detecting Code) for CD-ROM. Record data that is output from the CD-ROM encoder 24 is supplied to a CIRC encoder 23. The CIRC encoder 23 encodes the record data with an error correcting code in accordance with the CIRC system. The record data that has been error-corrected is supplied to an EFM circuit 22. The EFM circuit 22 performs an EFM (eight-to-fifteen modulation) for the record data. Thus, the EFM circuit 22 converts eight-bit data into 14-bit data and outputs the record data as 14-bit data. The record data that is output from the EFM circuit 22 is supplied to a recording circuit 21. The recording circuit 21 performs record-encoding for the record data. The record data that has been record-encoded is supplied to the optical system OP 20.

The optical system OP 20 controls a laser output of the laser light source so that the strength of the laser output becomes suitable for recording. The laser light source is modulated and driven in accordance with the record signal supplied from the recording circuit 21. The modulated laser light is irradiated to a record layer of the CD-R 1. On the CD-R 1, predetermined pits are formed with the irradiated laser light. As a result, the record signal is recorded onto the CD-R 1.

To properly record the record signal, while the laser output is being varied, it is test-recorded to the PCA. The laser light source is adjusted in accordance with the result so as to obtain an optimum laser output. Thereafter, the data is recorded in the program area. After data of a first track has been written to the program area, the record start time and record end time are read from the ATIP. When the data of the first track written, those data that has been read from the ATIP is written to the PMA. Likewise, data of a second or later track is written.

After all tracks have been written, a finalizing process is performed. In other words, a lead-out is written from an outer periphery of the program area. TOC information is created in accordance with information written to the PMA. The created TOC information is written to a lead-in area that is formed on an inner periphery of the program area. In other words, the UID that has been initially recorded in the PMA is also written to the lead-in area. In such a manner, a disc of the CD-R 1 that complies with the Yellow Book is produced.

The management server 12 is capable of transmitting the UID transmitted from the information terminal unit 10 thereto along with the download data requested in accordance with the UID. When the information terminal unit 10 side records the received download data, the information terminal unit 10 may read the UID of the recording medium onto which the download data is recorded, collate the UIS of the recording medium with the UID received along with the download data, and does not permit the download data to be recorded to the recording medium when these UIDs do not match or when the UID has not been read from the recording medium.

In addition, the management server 12 may manage an access history of the same UID. In this case, the management server 12 may be controlled in such a manner that when the management server 12 is accessed with a particular UID, a special service may be provided and that when the management server 12 is accessed with the same UID second time, the special service may not be provided.

When the management server 12 analyzes accessed UIDs and content information downloaded with the UIDs, a marketing research can be performed.

In the foregoing description, when a UID has been transmitted from the information terminal unit 10, contents are transmitted as download data from the management server 12 to the information terminal unit 10. However, the present invention is not limited to such an example. For example, key information with which encrypted contents are decrypted or password information with which a particular site on the Internet is accessed may be transmitted from the management server 12 to the information terminal unit 10.

Alternatively, UIDs may be used as lots. For example, when UIDs are serial numbers, permission or non-permission of contents to be downloaded and the number of contents that can be downloaded can be controlled in accordance with the last digits of the UIDs.

Alternatively, the CD-R 1 on which a UID is pre-recorded may be used as a pre-paid medium. For example, a CD-R on which a UID is recorded may be sold at a higher price than a CD-R on which a UID is not recorded. In this condition, the foregoing download service or the like is performed using UIDs. When the difference of the price of a CD-R on which a UID is recorded and the price of a CD-R on which a UID is not recorded is paid back to a contents provider, it can receive a use fee or the like of the contents.

Next, a second embodiment of the present invention will be described. According to the second embodiment, a copy and a move of data to a recording medium onto which data can be recorded by a user and onto which a UID is recorded are controlled with a UID.

In this case, the copy is an operation of which copyrighted data recorded on a first data recording medium is almost identically copied to a second data recording medium. When the copy is performed, the data of the copy source is not erased, but left. Both the data of the copy destination and the data of the copy source can be reproduced. On the other hand, the move is an operation of which copyrighted data recorded on the first data recording medium is almost identically copied to the second data recording medium. In this case, the data of the copy source cannot be reproduced.

Like the foregoing first embodiment, in the following description, it is assumed that a recording medium onto data can be recorded by a user is a CD-R and that it has the same data layout as that shown in FIG. 1. Likewise, for simplicity, description of common portions to the foregoing first embodiment will be omitted.

The system structure described with reference to FIG. 2 can be applied to the second embodiment of the present invention. Next, with reference to FIG. 2, an operation according to the second embodiment of the present invention will be described in brief. A CD-R 1 is loaded into a data recording and reproducing apparatus of the information terminal unit 10. Now, it is assumed that by recording copyrighted contents data onto the CD-R 1, the contents are copied. For example, by reading music contents recorded in a commercial CD-DA from the data reproducing apparatus of the information terminal unit 10 or another data reproducing apparatus connected to the information terminal unit 10 and recording the music contents onto the CD-R 1, the music contents are copied.

The CD-R 1 is loaded into the data recording/reproducing apparatus of the information terminal unit 10. In addition, a CD-DA is loaded into another data reproducing apparatus of the information terminal unit 10. When the user issues a command that causes contents data recorded on the CD-DA to be copied to the CD-R 1, a UID is read from the CD-R 1. The UID is transmitted to a management server 12 through Internet 11. When the management server 12 has determined that the transmitted UID is valid, the management server 12 notifies the information terminal unit 10 of that through the Internet 11. The information terminal unit 10 reproduces the contents data recorded on the CD-DA therefrom and records the reproduced contents data onto the CD-R 1. As a result, the copy of the contents data is executed.

Figure 8:
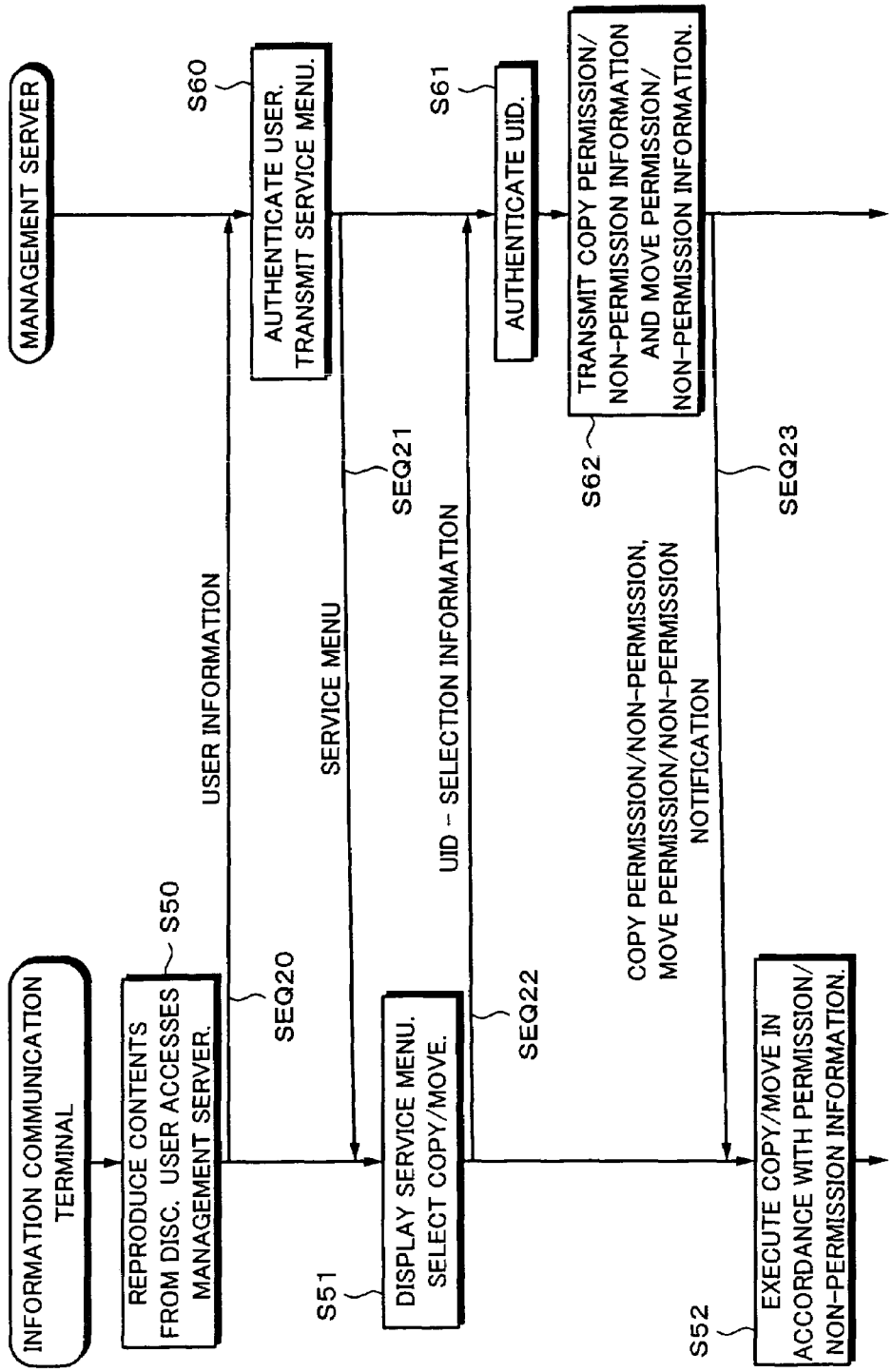
FIG. 8 is a sequence chart showing a procedure of an example of a data process performed between an information terminal unit and a management server.

FIG. 8 shows a procedure of an example of a data process performed between the information terminal unit 10 and the management server 12 when a copy and/or a move control for contents is performed according to the second embodiment of the present invention. Before the process shown in FIG. 4 is performed, the CD-R 1 is loaded into the information terminal unit 10. A UID is read from the CD-R 1. In addition, a menu program for providing a service according to the second embodiment of the present invention is started up. A menu screen is displayed on a displaying means of the information terminal unit 10.

The menu program controls for example a data recording/reproducing apparatus (that will be described later) of the information terminal unit 10 that is capable of recording data onto the CD-R 1 so as to control data to be recorded onto the CD-R 1 in accordance with a copy or move request for data recorded on another recording medium.

A recording medium for example a CD-DA on which contents to be copied are recorded is loaded into a data reproducing apparatus (not shown) of the information terminal unit 10. Using the menu program, the user issues a command causing contents recorded on the CD-DA to be recorded and copied to the CD-R 1.

The information terminal unit 10 side reproduces data from the disc (CD-R 1). The user accesses the management server 12 using the foregoing menu program (at step S50). As a result, user information is transmitted from the information terminal unit 10 to the management server 12 through the Internet 11 (at SEQ 20).

When the user information has been received by the management server 12, it authenticates the user in accordance with the received user information (at step S60). The user is authenticated for example in the following manner. When the user wants to receive a service, he or she has to pre-register his or her user information to the management server 12. By collating the user information transmitted from the information terminal unit 10 at SEQ 20 with the user information pre-registered in the management server 12, the management server 12 authenticates the user.

The user registration is performed in such a manner that the user inputs necessary information such as user information and transmits the input information to the management server 12 through the Internet 11 using the information terminal unit 10.

At step S60, a service menu that represents service items that can be provided for the user is transmitted from the management server 12 to the information terminal unit 10 authenticated thereby (at SEQ 21). The service menu is a list of operations such as a copy and move for contents that the authenticated user can execute.

When the service menu is received by the information terminal unit 10, the service menu is displayed on the displaying unit of the information terminal unit 10 at step S51.

When the user selects an operation that he or she wants to execute on the displayed service menu, the UID that has been read from the CD-R 1 loaded into the information terminal unit 10 and information that represents the selected operation are transmitted to the management server 12 (at SEQ 22). As a result, the information terminal unit 10 requests the management server 12 to allow the user to execute the selected operation.

When the management server 12 receives the UID transmitted at SEQ 22, the management server 12 authenticates the UID transmitted at SEQ 22 with reference to the database of UIDs (at step S61). Information that represents whether or not contents are permitted to be copied or information that represents whether or not contents are permitted to be moved is transmitted from the management server 12 in accordance with the authenticated result at step S62. The information terminal unit 10 is notified whether or not the contents are permitted to be copied or moved at SEQ 23.

When the management server 12 has notified the information terminal unit 10 that the contents are permitted to be copied at SEQ 23, the information terminal unit 10 reproduces the contents recorded on the CD-DA and records the reproduced contents onto the CD-R 1 at step S52. As a result, a copy of the contents to the CD-R 1 is executed.

In contrast, when the management server 12 has notified the information terminal unit 10 that the contents are not permitted to be copied at SEQ 23, for example information that represents that the contents are not permitted to be copied is displayed on the displaying means of the information terminal unit 10 at step S52. As a result, the contents recorded on the CD-DA are not recorded onto the CD-R 1.

In the foregoing description, user registration to the management server 12 is performed in accordance with user information that a user pre-inputs to the information terminal unit 10. However, the present invention is not limited to such an example. For example, when the user buys copyrighted contents such as a CD-DA from a store, contents information that represents the contents that the user bought and the user information may be transmitted from the store to the management server 12 so as to perform the user registration. The user information is correlated with the contents information and the correlated information is managed by the management server 12.

In that method, a service for a user can be controlled for individual contents. For example, the number of copies of the same contents permitted for each user can be set.

When user registration is correlated with contents, information of the CD-DA loaded into the drive of the information terminal unit 10 has to be transmitted to the management server 12 at step S50. When the CD-DA is loaded into the data reproducing apparatus, for example TOC information that is read from the CD-DA is transmitted from the information terminal unit 10 to the management server 12. The management server 12 can identify the CD-DA and the contents in accordance with the TOC information.

Like the foregoing first embodiment, the menu program may be pre-stored in a storing medium of the information terminal unit 10. In this case, when the CD-R 1 is loaded into the information terminal unit 10, the menu program may be automatically started up. Alternatively, the menu program may be started up in accordance with a use's operation to the information terminal unit 10. Alternatively, the CD-R 1 may be a hybrid disc and the menu program may be recorded in a CD-ROM portion of the hybrid disc.

Figure 9:
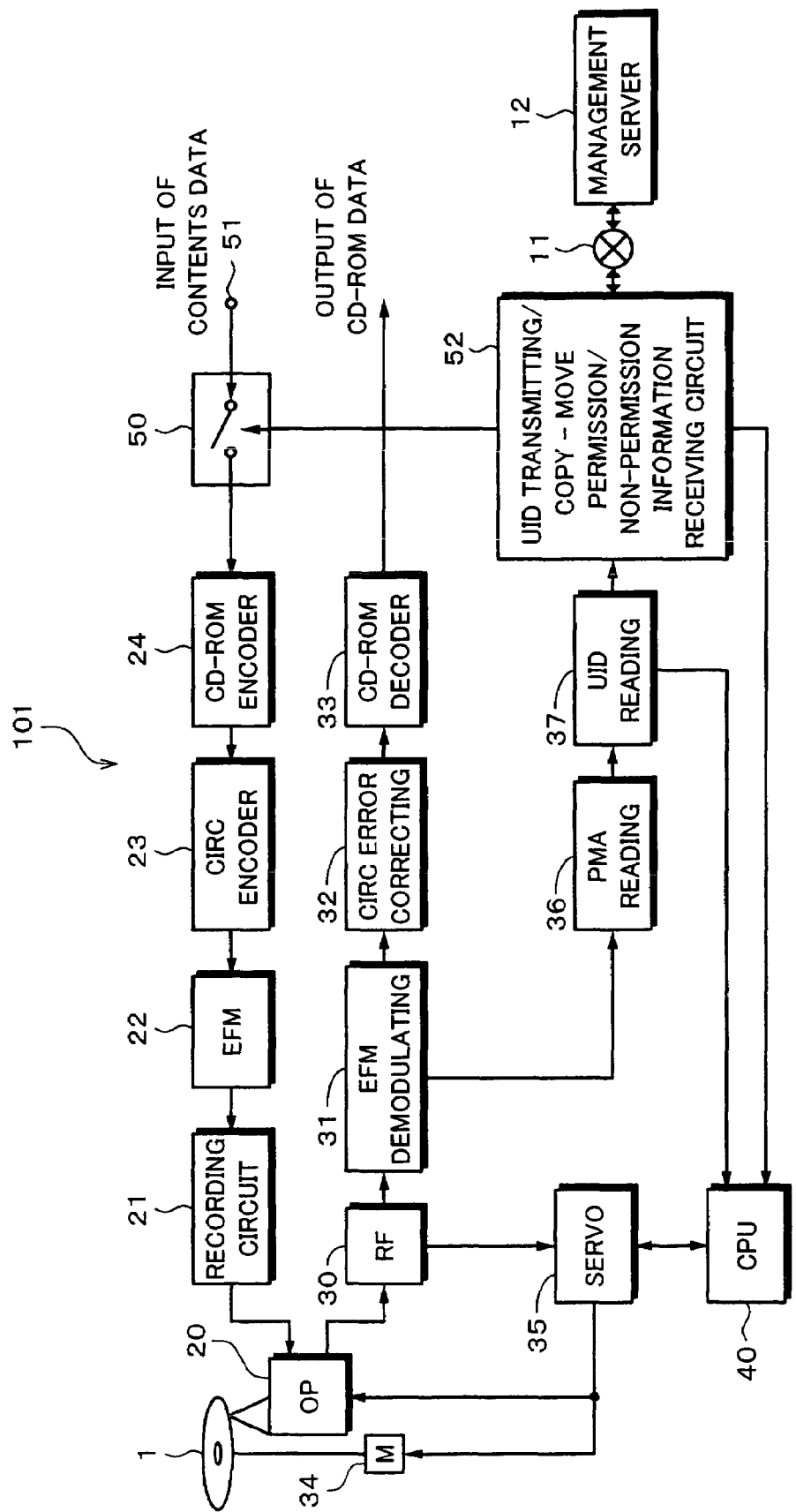
FIG. 9 is a block diagram showing a structure of an example of a data recording/reproducing apparatus according to a second embodiment of the present invention.

FIG. 9 shows a structure of an example of a data recording/reproducing apparatus 101 according to the second embodiment of the present invention. Like the data recording/reproducing apparatus 100 shown in FIG. 7, the data recording/reproducing apparatus 101 is built in the information terminal unit 10. In FIG. 9, common portions to those shown in FIG. 7 are denoted by the same reference numerals and their detailed description will be omitted.

Contents data to be recorded onto the CD-R 1 is input from a terminal 51 and supplied to a CD-ROM encoder 24 through a switch circuit 50. ON/OFF states of the switch circuit 50 are controlled in accordance with a control signal supplied from a UID transmitting/copy—move permission/non-permission information receiving circuit 52. The control signal is output in accordance with a control signal that is transmitted from the management server 12 to the information terminal unit 10. The control signal is output in accordance with information that represents whether or not the contents are permitted to be copied and information whether or not the contents are permitted to be moved.

The CD-R 1 is loaded into the information terminal unit 10. In addition, the CD-DA onto which contents are copied is loaded into another driving apparatus of the information terminal unit 10. Thereafter, the menu program is started up and the service menu is displayed. The user requests the information terminal unit 10 to copy contents with the service menu displayed. The request is transferred to the CPU 40. The PMA of the CD-R 1 is accessed under the control of the CPU 40.

A PAM reading circuit 36 extracts data of the PMA from data that has been read from the CD-R 1. A UID reading circuit 37 extracts a UID from the data of the PMA. The extracted UID is supplied to the UID transmitting/copy—move permission/non-permission information receiving circuit 52 and then transmitted to the management server 12 through the Internet 11 along with the user information. As was described with reference to FIG. 8, the management server 12 authenticates the user information and the UID. Thereafter, the management server 12 transmits a notification that represents that for example the contents are permitted to be copied or moved to the information terminal unit 10.

When the notification transmitted from the management server 12 is received by the UID transmitting/copy—move permission/non-permission information receiving circuit 25, a control signal that controls the switch circuit 50 for an ON state in accordance with the received notification is output from the UID transmitting/copy—move permission/non-permission information receiving circuit 25. As a result, the switch circuit 50 is turned on. The contents data that is input from the terminal 51 is supplied to the CD-ROM encoder 24. The CD-ROM encoder 24 encodes the contents data with error correction codes for CD-ROM. Thereafter, predetermined processes are performed for the contents data by a CIRC encoder 23, an EFM circuit 22, and a recording circuit 21. Thereafter, the contents data is recorded onto the CD-R 1 by an optical system OP 20.

When a notification that represents that contents are not permitted to be copied or moved is transmitted from the management server 12, a control signal that controls the switch circuit 50 for an OFF state is output from the UID transmitting/copy—move permission/non-permission information receiving circuit 25. Thus, the contents data that is input from the terminal 51 is not supplied to the CD-ROM encoder 24. As a result, the contents data is not recorded onto the CD-R 1.

The management server 12 may transmit a UID transmitted from the information terminal unit 10 to the information terminal unit 10 along with a copy permission/non-permission notification or a move permission/non-permission notification in accordance with the UID. When the information terminal unit 10 side copies or moves contents in accordance with the received notification, the information terminal unit 10 side reads the UID from the recording medium onto which the contents are recorded and collates the UID received along with the notification with the UID that has been read from the recording medium. When they do not match or when the UID cannot be read from the recording medium, the information terminal unit 10 may be controlled so that the contents are not permitted to be copied or moved.

Alternatively, a CD-R 1 on which a UID is recorded may be used as a pre-paid medium. For example, a CD-R on which a UID is recorded may be sold at a higher price than a CD-R on which a UID is not recorded. In this condition, the foregoing copy or move control for contents is performed using UIDs. When the difference of the price of a CD-R on which a UID is recorded and the price of a CD-R on which a UID is not recorded is paid back to a contents provider, it can receive a use fee or the like of the contents.

In the foregoing description, the data recording medium according to the present invention is an optical disc such as a CD-R or a CD-RW, onto which data can be recorded by a user. However, the present invention is not limited to such an example. For example, the present invention can be applied to a variety of data recording mediums such as a hard disk drive, a semiconductor memory, and a magneto-optical disc, onto which a user can record data. When the data recording medium is a hard disc drive, a UID can be pre-recorded in a ROM or the like of a controller of the hard disk drive. When the data recording medium is a semiconductor memory, a ROM area can be formed in a part of the memory and a UID can be pre-recorded in the ROM area.

In the foregoing description, a UID is recorded in an area to which a user cannot access. However, the present invention is not limited to such an example. In other words, a UID can be recorded in an area to which a user can access on a data recording medium. For example, a UID may be pre-written as TOC information in a lead-in area of a CD-RW.

Moreover, in the foregoing description, a UID is pre-recorded onto a data recording medium. However, the present invention is not limited to such an example. Alternatively, when a blank CD-R disc is initially loaded into a drive unit, a UID may be written to the PMA or the like of the disc.

For example, when a blank disc is initially loaded into the data recording/reproducing apparatus of the information terminal unit 10, the management server 12 is accessed through the Internet 11. When the management server 12 is accessed, the management server 12 authenticates the user and issues a UID. The issued UID is transmitted from the management server 12 to the information terminal unit 10. The UID is received by the information terminal unit 10 and written to the loaded CD-R. Thus, a user who bought a regular CD-R can receive the foregoing download service and copy and move services of contents.

As described above, according to the present invention, since unique identification information is recorded onto a data recording medium onto which data can be recorded by a user, as an effect of the present invention, a blank data recording medium on which special data but identification information is not recorded and that is capable of providing a predetermined service for a user can be produced.

In addition, according to the first embodiment of the present invention, as an effect thereof, using unique identification information pre-recorded on a data recording medium onto which data can be recorded by a user, a data download service can be provided for the user. The downloaded data can be recorded onto the data recording medium. Thus, the data recording medium can be used as a pre-paid means.

In addition, according to the second embodiment of the present invention, as an effect thereof, using unique identification information pre-recorded on a data recording medium onto which data can be recorded by a user, a copy or move of contents data performed by the user can be controlled. Thus, the data recording medium can be used as a pre-paid means.

DESCRIPTION OF REFERENCE NUMERALS

1 CD-R
10 INFORMATION TERMINAL UNIT
1 INTERNET
12 MANAGEMENT SERVER
20 OPTICAL SYSTEM
21 RECORDING CIRCUIT
25 UID TRANSMITTING/DL DATA RECEIVING CIRCUIT
36 PMA READING CIRCUIT
37 UID READING CIRCUIT
40 CPU
50 SWITCH CIRCUIT
52 UID TRANSMITTING/COPY—MOVE PERMISSION/NON-PERMISSION INFORMATION RECEIVING CIRCUIT
S30 START UP MENU
S31 LOAD DISC
S32 UID PRESENT ?
S33 DISPLAY MENU
S34 DOES NOT DISPLAY MENU
S40 LOAD DISC
S41 UID PRESENT ?
S42 DISPLAY MENU
S43 DO NOT DISPLAY MENU

The invention claimed is:

1. A data recording medium on which unique identification information and a menu containing a list of predetermined services are recorded, and
    wherein upon verification of the unique identification information by a data processing apparatus, the menu containing the list of predetermined services is provided, and
    upon authentication of the unique identification information, it is determined whether data can be recorded onto the data recording medium.

2. The data recording medium as set forth in claim 1, wherein the data is data to be downloaded.

3. The data recording medium as set forth in claim 1, wherein the data is data to be copied or moved from another data recording medium.

4. The data recording medium as set forth in claim 1, wherein the identification information is recorded in an area preceded by a lead-in area and/or the lead-in area.

5. The data recording medium as set forth in claim 1, wherein the data recording medium is formed in a disc shape, and
    wherein the identification information is recorded in an area on an inner periphery side than the lead-in area.

6. The data recording medium as set forth in claim 5, wherein the area on the inner periphery side than the lead-in area is a test write area with which a laser strength for which data is recorded onto the data recording medium is adjusted.

7. The data recording medium as set forth in claim 1, wherein the data recording medium is an optical disc.

8. The data recording medium as set forth in claim 1, wherein the identification information can be authenticated through a communication network.

9. The data recording medium as set forth in claim 1, wherein the identification information is unique to the data recording medium.

10. A data recording method, comprising:
reading identification information from a data recording medium on which unique identification information and a menu containing a list of predetermined services are recorded;
verifying the unique identification information is written on the medium and upon verification, providing the menu containing the list of predetermined services;
authenticating the identification information that has been read; and
recording the data onto the data recording medium upon successful authentication of the identification information or failing to record data upon unsuccessful authentication.

11. The data recording method as set forth in claim 10, wherein the data is copied or moved from another data recording medium to the data recording medium on which the identification information is recorded upon successful authentication of the identification information.

12. The data recording method as set forth in claim 10, wherein the identification information is recorded in an area preceded by a lead-in area and/or the lead-in area.

13. The data recording method as set forth in claim 10, wherein the data recording medium is formed in a disc shape, and
wherein the identification information is recorded in an area on an inner periphery side than a lead-in area.

14. A data processing apparatus, comprising:
recording means for recording data onto a data recording medium that is recordable and on which unique identification information and a menu containing a list of predetermined services are recorded;
identification information reading means for reading the identification information from the data recording medium and upon verification that the identification information is recorded on the data recording medium, providing the menu containing the list of predetermined services;
authentication means for authenticating the identification information that has been read by the identification information reading means; and
controlling means for controlling the recording means so that the data is recorded onto the data recording medium upon successful authentication of the identification information or failing to record data upon unsuccessful authentication.

15. The data processing apparatus as set forth in claim 14, further comprising:
communication means for downloading the data through a communication network.

16. The data processing apparatus as set forth in claim 14, wherein the controlling means is configured to copy or move data recorded on another data recording medium to the data recording medium on which the identification information is recorded.

17. The data processing apparatus as set forth in claim 14, wherein the identification information is recorded in an area preceded by a lead-in area and/or the lead-in area, and
wherein the controlling means is configured to cause the identification information reading means to access the area preceded by the lead-in area and/or the lead-in area.

18. The data processing apparatus as set forth in claim 14, further comprising:
communication means for communicating with components located outside of the data processing apparatus,
wherein the controlling means transmits the identification information to a server and controls the communication means so as to receive an authentication result of the server in accordance with the identification information.

19. A data delivering method, comprising:
reading identification information from a data processing apparatus, the data processing apparatus being configured to read the unique identification information from a data recording medium that is recordable and on which the identification information and a menu containing a list of predetermined services are recorded and transmit the identification information to components located outside of the data processing apparatus;
providing the menu containing the list of predetermined services;
authenticating the received identification information;
delivering the data to the data processing apparatus upon successful authentication of the identification information, and
failing to deliver data upon unsuccessful authentication.

20. The data delivering method as set forth in claim 19, wherein the delivered data is recorded onto the data recording medium.

21. A data delivering apparatus, comprising:
receiving means for receiving identification information from a data processing apparatus, the data processing apparatus being configured to read the identification information from a data recording medium that is recordable and on which unique identification information and a menu containing a list of predetermined services are recorded and transmit the identification information to components located outside of the data processing apparatus;
providing means for providing the menu containing the list of predetermined services;
authenticating means for authenticating the received identification information; and
delivering means for delivering the data to the data processing apparatus upon successful authentication of the identification information, and failing to deliver data upon unsuccessful authentication.

22. The data delivering apparatus as set forth in claim 21, wherein the delivered predetermined data is recorded onto the data recording medium.

23. A data transmitting method, comprising:
receiving identification information from a data processing apparatus, the data processing apparatus being configured to read the identification information from a first data recording medium that is recordable and on which unique identification information and a menu containing a list of predetermined services are recorded and transmit the identification information to components located outside of the data processing apparatus;
providing the menu containing the list of predetermined services;
authenticating the received identification information; and
transmitting permission data that permits the data to be copied or moved from a second data recording medium to the first data recording medium upon successful authentication of the identification information.

24. A data transmitting apparatus, comprising:
receiving means for receiving identification information from a data processing apparatus, the data processing apparatus being configured to read the identification information from a first data recording medium that is recordable and on which unique identification and a menu containing a list of predetermined services are recorded and transmit the identification information to components located outside of the data processing apparatus;

providing means for providing the menu containing the list of predetermined services;

authenticating means for authenticating the received identification information;

transmitting means for transmitting permission data that permits the data to be copied or moved from a second data recording medium to the first data recording medium upon successful authentication of the identification information; and delivering means for delivering data to the data processing apparatus.

25. A data delivering system, comprising:

a data processing apparatus that includes reading means for reading identification information from a data recording medium that is recordable and on which unique identification information and a menu containing a list of predetermined services are recorded, and upon verification that identification information is recorded on the data recording medium, accessing the menu containing the list of predetermined services; and a data delivering apparatus that includes receiving means for receiving the identification information from the data processing apparatus, providing means for providing the menu containing the list of predetermined services;

authenticating means for authenticating the received identification information; and delivering means for delivering the data to the data processing apparatus upon successful authentication of the identification information, and for failing to deliver data upon unsuccessful authentication.

26. A data communication system, comprising:

a data processing apparatus that includes reading means for reading identification information from a first data recording medium, that is recordable and on which unique identification information and a menu containing a list of predetermined services are recorded;

providing means for providing the menu containing the list of predetermined services;

receiving means for receiving the identification information from the data processing apparatus; and a data transmitting apparatus including authenticating means for authenticating the received identification information, transmitting means for transmitting permission data that permits the data to be copied or moved from the second data recording medium to the first data recording medium upon successful authentication of the identification information, and delivering means for delivering data to the data processing apparatus.

27. The data recording medium as set forth in claim 1, wherein the data recording medium is a hybrid disc whose inner periphery and outer periphery are a recorded CD-ROM portion and a writable CD-R portion, respectively.

* * * * *